(12) United States Patent
Mertens et al.

(10) Patent No.: US 11,746,975 B2
(45) Date of Patent: Sep. 5, 2023

(54) OPERATING A LIGHTING MODULE WITH LED ELEMENTS

(71) Applicant: Lumileds Holding B.V., Schiphol (NL)

(72) Inventors: Jürgen Mertens, Wuerselen (DE); Harry Gijsbers, Heerlen (NL); Astrid Marchewka, Aachen (DE); Benno Spinger, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 16/444,368

(22) Filed: Jun. 18, 2019

(65) Prior Publication Data
US 2019/0383460 A1 Dec. 19, 2019

(30) Foreign Application Priority Data
Jun. 19, 2018 (EP) ..................... 18178444

(51) Int. Cl.
*F21S 41/147* (2018.01)
*F21S 41/663* (2018.01)
(Continued)

(52) U.S. Cl.
CPC .......... *F21S 41/147* (2018.01); *B60Q 1/1415* (2013.01); *F21S 41/32* (2018.01);
(Continued)

(58) Field of Classification Search
CPC ........ F21S 41/32; F21S 41/147; F21S 41/663; F21S 45/10; F21S 45/47; B60Q 1/1415
See application file for complete search history.

(56) References Cited

U.S. PATENT DOCUMENTS

| 8,646,956 B2 | 2/2014 | Hering et al. |
| 9,611,997 B2 | 4/2017 | Bauer et al. |

(Continued)

FOREIGN PATENT DOCUMENTS

| DE | 102008036193 A1 | 2/2010 |
| EP | 2058585 A2 | 5/2009 |

(Continued)

OTHER PUBLICATIONS

International Preliminary Report on Patentability dated Dec. 22, 2020 for PCT International Application No. PCT/EP2019/065859.
(Continued)

*Primary Examiner* — Alexander H Taningco
*Assistant Examiner* — Pedro C Fernandez
(74) *Attorney, Agent, or Firm* — Volpe Koenig

(57) ABSTRACT

A lighting system and a method of operating a lighting module are described. The lighting module includes a heat sink a first LED element mounted on the heat sink emits light as a low beam pattern. A second LED element mounted on the heat sink emits light as a high beam pattern. A driver circuit electrically connected to the first and second LED elements to selectively supply electrical power for operation. The driver circuit is disposed to operate in a first and a second mode. In the first mode, to provide a low beam illumination, the first LED element is operated in a high power state while the second LED element is turned off. In the second mode, to provide a high beam illumination, the second LED element is operated in a high power state, while the first LED element is operated in a dimmed state.

16 Claims, 5 Drawing Sheets

(51) Int. Cl.
*F21S 45/47* (2018.01)
*F21S 41/32* (2018.01)
*B60Q 1/14* (2006.01)
*H05B 45/10* (2020.01)
*F21Y 115/10* (2016.01)

(52) U.S. Cl.
CPC ............. *F21S 41/663* (2018.01); *F21S 45/47* (2018.01); *H05B 45/10* (2020.01); *F21Y 2115/10* (2016.08)

(56) References Cited

U.S. PATENT DOCUMENTS

| | | | |
|---|---|---|---|
| 9,671,080 B2 | 6/2017 | Seyrlehner et al. | |
| 2010/0142883 A1* | 6/2010 | Kim | H05K 3/00 29/852 |
| 2011/0080753 A1* | 4/2011 | Hering | F21S 41/153 362/545 |
| 2013/0107564 A1* | 5/2013 | Yatsuda | F21S 41/338 362/543 |
| 2013/0201710 A1* | 8/2013 | Suzuki | F21S 41/686 362/512 |
| 2013/0207559 A1* | 8/2013 | Ferrier | H05B 45/48 315/192 |
| 2014/0321141 A1* | 10/2014 | Bauer | F21S 41/321 362/235 |
| 2018/0142879 A1* | 5/2018 | Elwell | F21V 29/89 |
| 2018/0372303 A1* | 12/2018 | Na | F21V 14/003 |

FOREIGN PATENT DOCUMENTS

| | | |
|---|---|---|
| EP | 2213935 A1 | 8/2010 |
| EP | 2431657 A2 | 3/2012 |
| WO | 2013/071972 A1 | 5/2013 |

OTHER PUBLICATIONS

International Search Report dated Dec. 26, 2019 for PCT International Application No. PCT/EP2019/065859.
Extended European Search Report dated Oct. 30, 2018 for European Patent Application No. 18178444.8.

* cited by examiner

OPERATING A LIGHTING MODULE WITH LED ELEMENTS

FIELD OF INVENTION

The invention relates to a lighting system, a vehicle headlight including a lighting system, and to a method of operating LED elements of a lighting module.

BACKGROUND

LED elements are increasingly used for lighting applications, such as for example automotive lighting.

US 2013/0107564 A1 discloses a vehicle headlamp comprising a module main body on which a first and a second semiconductor light emitting device are directly attached. Furthermore, the lighting unit comprises a heat dissipation member to dissipate the heat generated by the first and the second semiconductor light emitting device and by a drive circuit for the device. The vehicle headlamp is operated such that either a low-beam light distribution pattern is formed if a first LED is turned on and a second LED is turned off, or a high-beam light distribution pattern is formed if a first LED is turned off and a second LED is turned on.

SUMMARY

It may be considered an object to provide a lighting system, a vehicle headlight and an operating method for a lighting module with LED elements which allow to efficiently achieve different lighting functions with a compact design.

This object may be addressed by a lighting system according to claim 1, a vehicle headlight according to claim 13, and an operating method according to claim 14. Dependent claims refer to preferred embodiments of the invention.

The present inventors have recognized that for lighting purposes, and in particular for automotive front lighting, the same LED module may be efficiently used to obtain different beam shapes, i.e. light beams emitted from the lighting system with different spatial distributions. For example, in an automotive headlight, this may comprise beams with a low beam and a high beam shape. In order to be able to achieve a compact design while providing sufficient heat dissipation, the inventors propose to provide a first and a second LED element to be mounted on a common heat sink of an LED module. By operating the first and second LED elements in a disjunct manner, i.e. high power operation of one LED element excluding that of the other, the total thermal load is limited. Under the proposed mode of operation, a first LED element may be operated at high power, whereas the second LED element is turned off. If, however, the second LED element is operated at high power, the first LED element is operated in a dimmed state.

One aspect of the invention implementing this general idea provides a lighting system with a lighting module including a heat sink, a first LED element mounted on the heat sink, disposed and arranged such that light from the first LED element is emitted in operation from the lighting system as a low beam pattern, a second LED element mounted on the same heat sink, disposed and arranged such that light emitted in operation from the second LED element is emitted from the lighting system as a high beam pattern, driver means electrically connected to the first and second LED elements to selectively supply electrical power for operation. The driver means are disposed to in a first mode, to provide a low beam illumination, operate the first LED element in a high power state while the second LED element is turned off, and in a second mode, to provide a high beam illumination, operate the first LED element in a dimmed state while operating the second LED element in a high power state.

Another aspect of the invention relates to a method of operating a first and second LED element of a lighting module, which are both mounted on a common heat sink. The method includes in a first mode, to provide a low beam illumination, operating the first LED element in a high power state to emit a low beam pattern, while the second LED element is turned off, and in a second mode, to provide a high beam illumination, operating the second LED element in a high power state to emit a high beam pattern, while operating the first LED element in a dimmed state.

In both aspects, the "dimmed state" may be understood as referring to the corresponding LED element being operated with less operating power as compared to the high power state. The low and high beam patterns refer to the spatial distribution of light generated from one of the LED elements as emitted from the lighting system. The low and high beam patterns differ, i.e. have different spatial intensity distribution. This may be due to different types of LED elements (which, in the present context, should be understood as comprising one or more solid state lighting elements of any type, such as light emitting diodes, organic light emitting diodes, organic light emitting diodes, laser diodes etc.), or may be due to separate beam paths through an optical system of the lighting system, which may include one or more reflectors, lenses, collimators etc. Preferably, the beam paths share common elements of the optical system, i.e. at least one common reflector, lens, etc. In particular, the low and high beam pattern may differ in the vertical intensity distribution, preferably with the low beam pattern having a narrower intensity distribution in vertical direction as compared to the high beam pattern. Preferably, the low beam pattern may include an at least substantially horizontal bright/dark-cut off, e.g. such as used in automotive front lighting. Further preferred, the high beam pattern may have a broader vertical intensity distribution than the low beam pattern, particularly preferred without a cut off.

According to the invention, it may be preferred to operate, in the first mode, the first LED element in the high power state to emit a low beam pattern, while turning off the second LED element. In the second mode, it may be preferred to operate the second LED element in the high power state to emit light in a high beam pattern, while operating the first LED element in a dimmed state to emit dimmed light in a low beam pattern.

In the first mode, the lighting system may provide a low beam illumination. In the second mode, the lighting system may provide a high beam illumination. The illumination generated by the lighting system may be understood as the resulting beam shape of both the first and second LED elements combined, i.e. the sum of the beam patterns. Driving the first LED element and the second LED element simultaneously in order to combine dimmed light in a low beam pattern and light in a high beam pattern, may be an efficient use of the LED elements because the first LED element is applied in both modes.

According to the discussed aspect of the invention, both the first and the second LED element are mounted on the same heat sink. The heat sink may be made out of a material with good heat conduction, preferably metal, in particular comprising aluminum and/or copper. The heat sink may be made in one piece, or may be comprised several pieces joined together. Preferably, at least the portion of the heat sink where the first and second LED elements are mounted may be formed in one piece.

The driver means are provided to supply electrical operating power to the first and second LED elements in a controlled manner. They may be controllable to operate the first and second LED element selectively in the first or second mode. The driver means may be controllable to select further types of operating modes, e.g. with both first and second LED elements being turned off or operating in a dimmed state. Preferably, the driver means do not comprise an operating mode where both the first and second LED elements are operated in the high power state.

The driver means may be fully or partially provided on the LED module, or may be provided spaced therefrom. They may comprise power circuitry to switch and/or to transform available electrical power to a voltage and/or current suitable for operation of the LED elements. Further, the driver means may include control means for selecting the operating modes and for controlling the power circuitry to supply electrical power as selected by the operating mode.

A dimmed state of the LED elements may be understood to mean that the LED element is provided with less electrical operating power as compared to operation in high power state, e.g. by providing lower current and/or voltage, and/or by providing electrical power intermittently, such as in time modulated form, in particular as a pulse width modulated voltage and/or current, reducing the time average electrical operating power.

In a preferred embodiment of the invention, in the high power state, the first LED element is operated at a higher electrical power than in the dimmed state.

According to one embodiment of the invention, the driver means are disposed to operate the first LED element in the dimmed state with pulse width modulation.

It should be understood that high power operation of both the first and second LED elements does not necessarily require operation with DC electrical power at a fixed voltage or current, as is e.g. the nominal or maximal allowable current given in the LED datasheet. Even in the high power state, electrical power supplied to the first and/or second LED elements may e.g. be time modulated, in particular pulse width modulated. In some embodiments, the high power state operation of the first and second LED element may follow a temperature dependent curve of modulation levels to achieve an at least substantially constant high luminous flux output from the LED element. In embodiments, where the LED elements are operated both in the high power state and the dimmed state in a time modulated manner (in particular PWM), the LED element operated in the dimmed state will be supplied with a lower time average electrical operating power, in particular with a lower duty cycle.

In the dimmed state, the corresponding LED element (i.e. the first LED element in the second mode) may preferably be supplied (on time average) e.g. with less than 50% of the electrical power at high power operation, preferably with 30% or less, further preferred with 20% or less. Preferably, reference to high power operation may be understood as referring to operating an LED element with the highest electrical power compared to all other regular operating modes of the driver means.

Preferably, in the high power state, the respective LED element is operated to emit a desired high luminous flux as required by the application. The luminous flux emitted from the first LED element in the dimmed state may preferably be less than 50%, further preferred 30% or less compared to the high power operation.

In some embodiments, the different operating states (high power vs. dimmed) of the LED elements may be defined by the light output (luminous flux).

In one approach, the light output in the high power and in the dimmed state may be defined as compared to a maximum light output (i.e. the maximum possible luminous flux emitted from the respective LED element in a thermally stable operation). Preferably, in the high power state, the LED elements are operated to emit more than 60%, further preferably more than 80% of the maximum light output. Preferably, in the dimmed state the LED elements are operated to emit less than 40%, further preferably less than 20% of the maximum light output.

In an alternative approach, the high power and the dimmed state may be defined as compared to a nominal light output (i.e. the maximal luminous flux emitted from the respective LED element at nominal current). Preferably, in the high power state the LED elements are operated to emit more than 70%, further preferably more than 90% of the nominal light output. Preferably, in the dimmed state the LED elements are operated to emit less than 50%, further preferably less than 30% of the nominal light output.

Another way of operating an LED element in a dimmed state is possible if the LED element comprises multiple LEDs. According to a further embodiment of the invention, the first LED element may comprise a plurality of LEDs and the driver means may be disposed to operate a first number of the LEDs in the first mode and a second number of the LEDs in the second mode, wherein the first number is higher than the second number. According to this embodiment, the first LED element may be dimmed by operating less LEDs in the dimmed state than in the high power state. Preferably, all LEDs of the first LED element may be operated in the high power state, whereas only a portion of the LEDs is operated in a dimmed state. The first number may e.g. be eight and the second number may be three, or the first number may be ten and the second number may be four. It may be preferred, that a quotient of the first number divided by the second number is less than four, further preferred the quotient is between two and three.

According to a further embodiment, the first LED element comprises a first group of LEDs and a second group of the LEDs. The driver means may be disposed to operate the first group in both the first and the second mode, and to operate the second group in the first mode and not in the second mode. In this embodiment, the dimmed state of the first LED element may be realized by only operating the first group of LEDs. The high power state may be realized by operating the first and the second group of the first LED element. Thus, the LEDs of the first group may efficiently be used as they are operated in both the first and in the second mode. This may be advantageous to reduce manufacturing cost and the size of the lighting system.

In a preferred embodiment, the second group may be electrically connected in parallel with the second LED element. Thus, the second group and the second LED element may form a parallel connection. The parallel connection may be electrically connected in series with the first group. The first group, the second group and the second LED element each may comprise several LEDs which are connected in series. The series connection of the first group and the parallel connection may be connected to the driver means. Preferably, the driver means are disposed to switch between the first group and the second LED element, e.g. by operating a toggle switch.

By providing the first and second LED element on the same heat sink, the same component may be efficiently used by both, thus reducing the part count and allowing a compact design. However, the capacity of the heat sink to dissipate heat generated by the LED elements in operation may be limited. The disjunct first and second mode of operation address this problem, thereby limiting the total operating power. In consequence, the heat sink need not be configured to dissipate heat from both the first and second LED element in high power operation, making more compact and efficient designs possible. This advantage applies if the second LED element in the first mode is turned off or if the first LED element in the second mode is strongly dimmed to e. g. 20% or less of the power at high power operation.

According to one embodiment of the invention, the heat sink may comprise a body portion and a protrusion portion. The protrusion portion may protrude from the body portion. At least one of the first and second LED elements, and preferably even both the first and the second LED elements may be mounted on the protrusion portion. The body portion may be larger than the protrusion portion, i.e. have a higher volume and/or dimension at least in one direction, preferably in a direction perpendicular to the protrusion direction. The body portion may in particular be provided with heat fins for dissipating heat. The protrusion portion and body portion may be formed in one piece. In preferred embodiments, the body portion may include a plate member, i.e. a rectangular plate member, and the protrusion portion may protrude from a center portion of the plate member, e.g. perpendicular to the plate surface. If a protrusion portion is provided which is separate from a body portion of the heat sink the capacity for heat dissipation may be particularly limited, e.g. due to the longitudinal extension and/or smaller volume of the protrusion portion. If one or even both the first and second LED elements are provided on the protrusion portion, the disjunct operating mode is particularly advantageous for allowing a compact design with a heat sink of minimal size while providing sufficient capacity for heat dissipation.

In particularly preferred embodiments, the first and second LED element may be mounted on opposite sides of the protrusion portion, in particularly arranged directly opposite to each other, e.g. in a mirrored configuration.

According to one embodiment, the lighting system may include an optical system, e.g. including one or more reflectors, collimators and/or lenses etc. The components of the optical system advantageously shape the distribution of the resulting beams that form the resulting beam illuminations emitted from the lighting system. In particular, the shape of a beam may be defined by the shape of a reflector reflecting light from the first and/or second LED element, and at least one projection lens may serve to project the light reflected from the reflector as resulting beam forming the resulting beam illumination.

It is particularly preferred to provide the lighting module exchangeably mounted relative to the optical system i.e. such that the lighting module including the heat sink and the first and second LED element elements may be exchanged and replaced, for example in the case of damage. Preferably, detachable mechanical mounting means and/or detachable electrical connection means may be provided to establish a detachable electrical and/or mechanical connection to the exchangeable lighting module. The electrical connection means may e.g. include an electrical plug connector. The mechanical mounting means may include any type of detachable mounting means, such as e.g. clamping means, bayonet connection, snap-in connection, etc. Further, alignment means may preferably be provided to ensure a defined alignment of the lighting module relative to the optical system. In particular, one or more module alignment protrusion and/or indentation may be provided, disposed to engage with system alignment protrusions and /or indentations.

In particularly preferred embodiments, the heat sink comprises a protrusion portion as described above with at least one of the LED elements mounted thereon. An optical system may comprise at least one concave reflector, defining an inner reflector space. The lighting module may be mounted such that the protrusion portion projects into the reflector space, i.e. positioning at least one LED element inside of the concave reflector. This arrangement is especially well-suited to make efficient use of a reflector surface, in particular if one or more LED elements are arranged on the protrusion portion facing sideways or even partially backwards, i.e. partially opposite to the forward direction defined by the direction into which the protrusion portion protrudes.

These and other aspects of the invention will be apparent from and elucidated with reference to the embodiments described hereinafter.

DETAILED DESCRIPTION OF THE PREFERRED EMBODIMENTS

Figure 1:
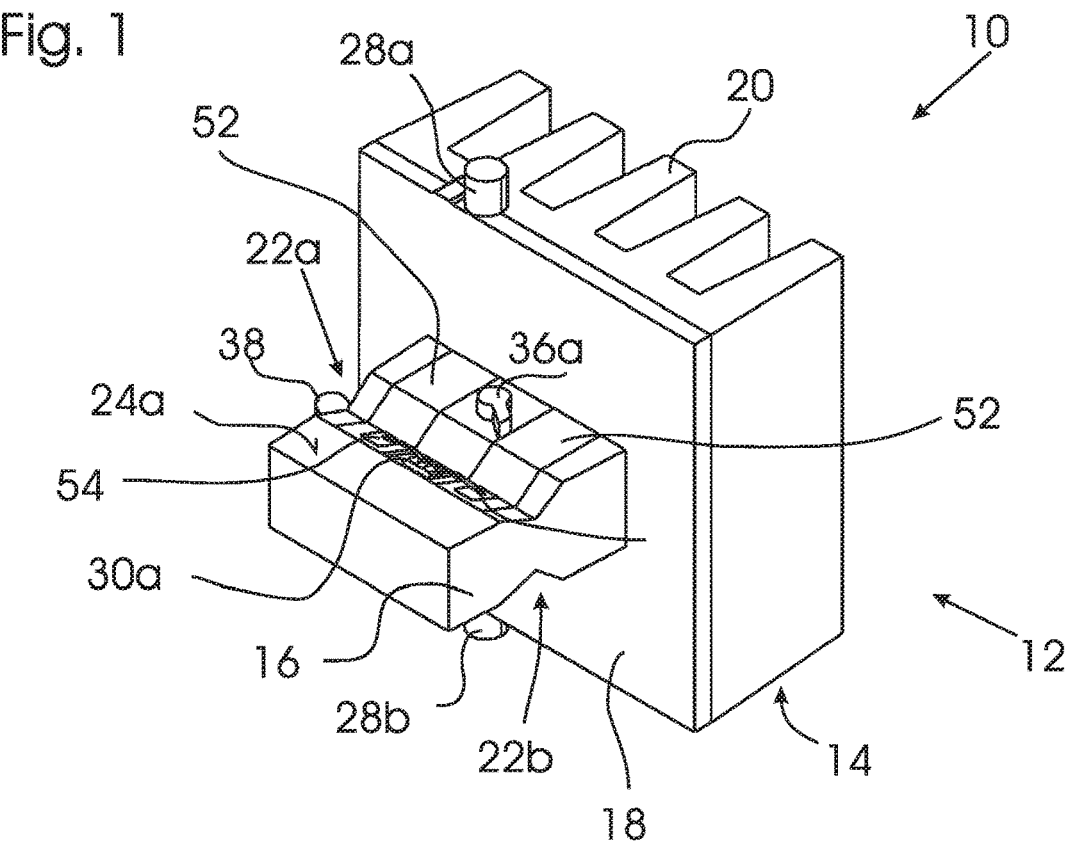
FIG. 1 shows a perspective view of a first embodiment of a lighting module.

A first embodiment of an LED lighting module 10 is shown in FIGS. 1-6. The lighting module 10 includes a heat sink 12 comprised of a body portion 14 and a protrusion portion 16.

The body portion 14 is comprised of a rectangular plate 18 from which the protrusion portion 16 protrudes into a forward direction F (designated in FIG. 2) and which has heat fins 20 extending in backward direction.

The heat sink 12 is made of a metal heat sink material with good heat conducting properties, in particular of Aluminum. In the preferred embodiment, the body portion 14 and protrusion portion 16 are formed in one piece, although in alternative embodiments the parts forming the heat fins 20, plate 18 and protrusion portion 16 may be separate parts fixed to each other.

The protrusion portion 16 protrudes from a center portion of the plate 18. The forward direction F is perpendicular to the forward surface of the plate 18. In the example shown, the protrusion portion 16 has rectangular cross-section. Further, in the preferred example as shown the central longitudinal axis X of the protrusion portion 16 extends in parallel with the forward direction F.

A recess 22a in the shape of a V-shaped groove is formed in an upper surface 24a of the protrusion portion 16. A further recess 22b is provided in the lower surface 24b of the protrusion portion 16 in mirrored configuration.

A first mounting surface 26a is provided on the upper surface 24a, within the groove 22a, and a second mounting surface 26b is provided on the lower surface 24b within the groove 22b. A first and a second LED element 30a, 30b are attached on the respective first and second mounting surfaces 26a, 26b.

Figure 3:
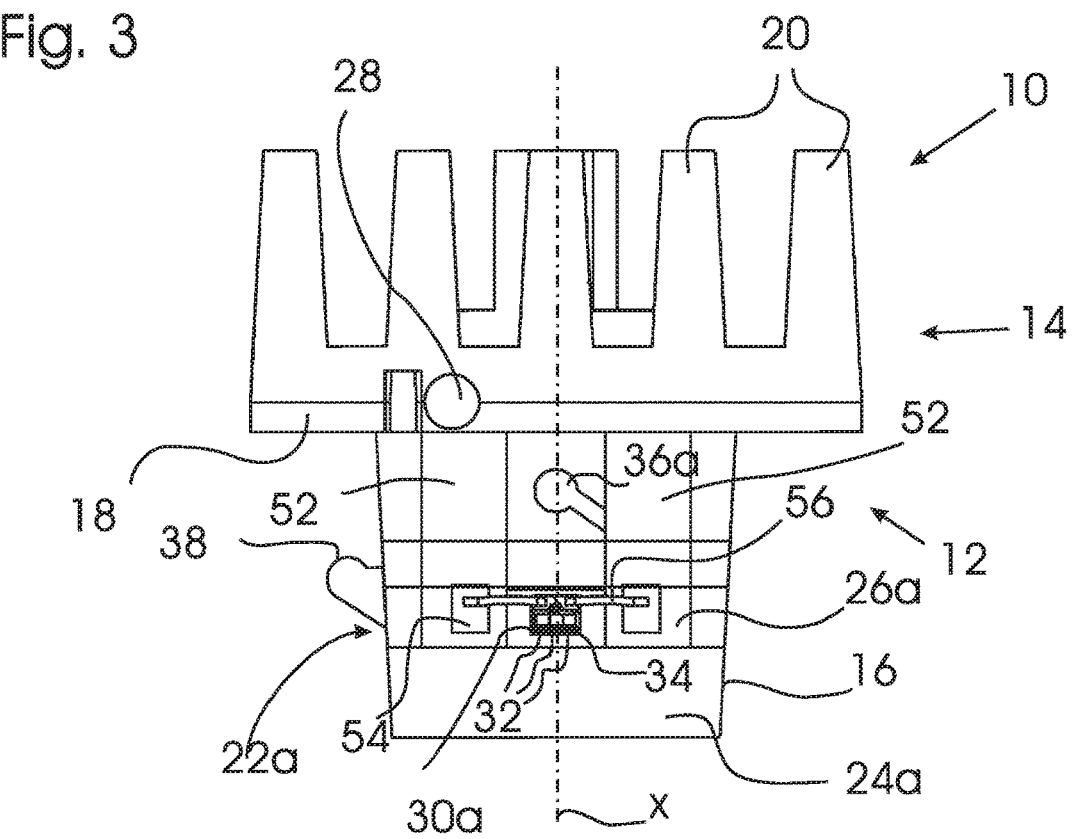
FIGS. 3, 4 show a top and a back view of the lighting module of FIGS. 1, 2.
Figure 4:
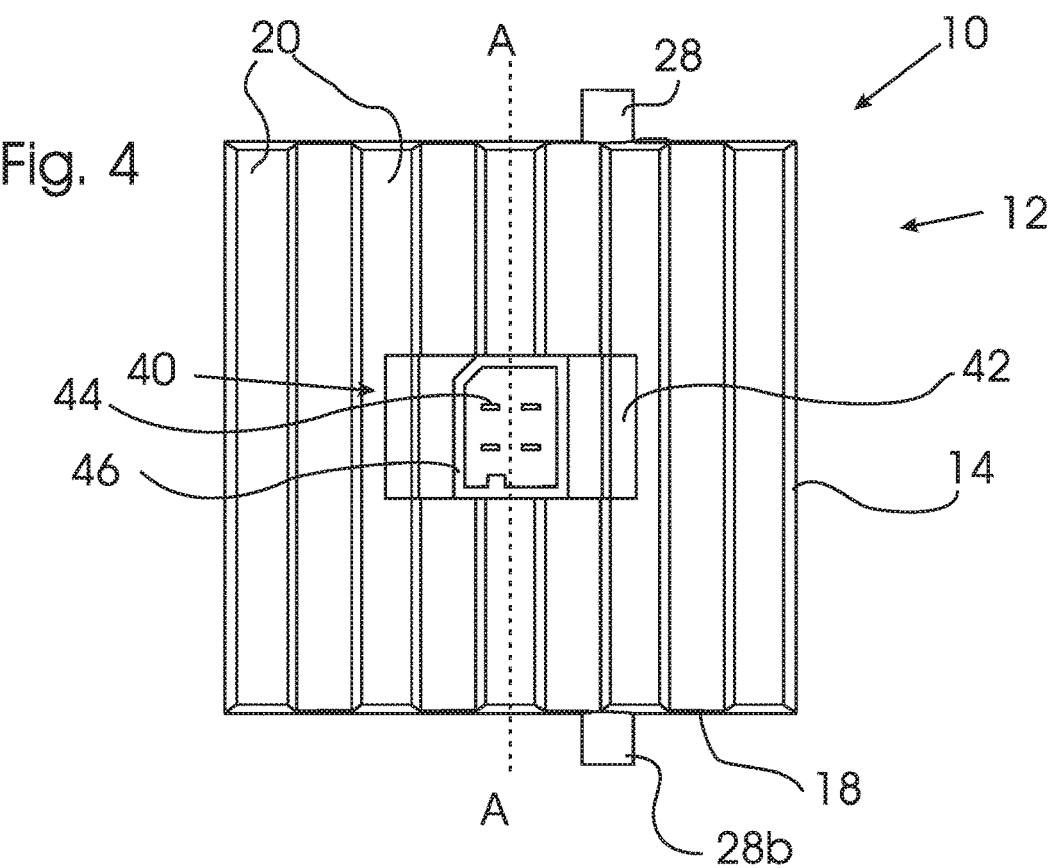
Figure 5:
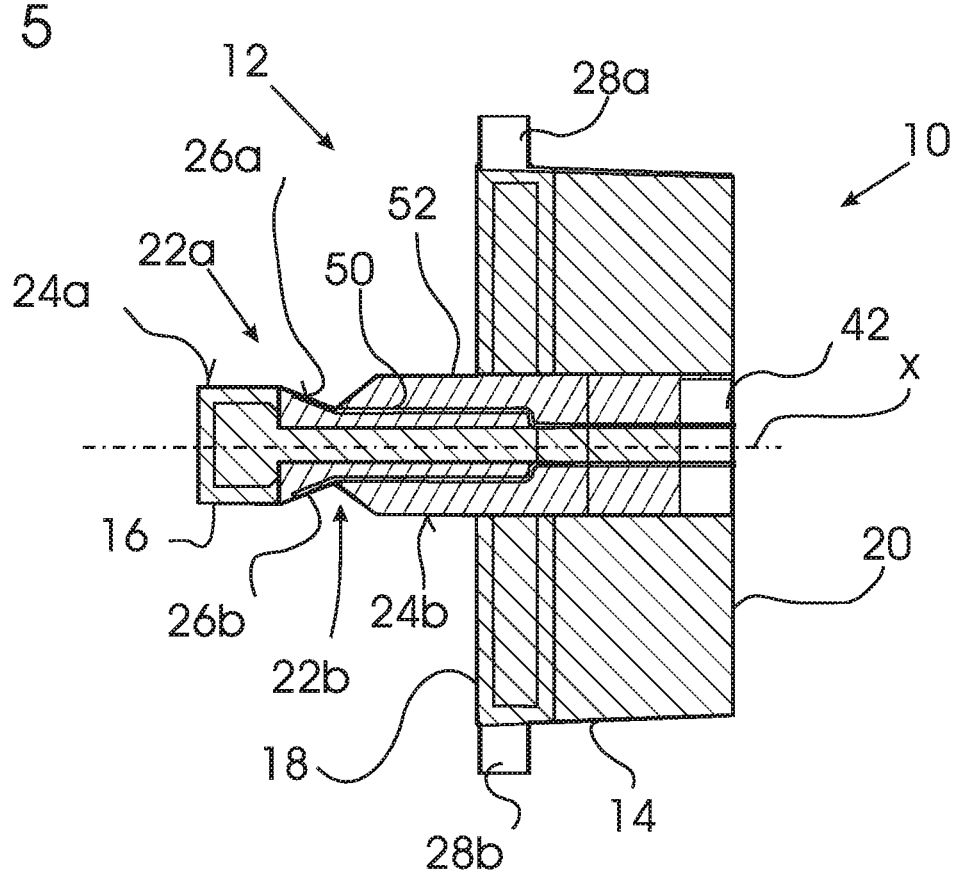
FIG. 5 shows a sectional view of the lighting module of FIGS. 1-4 with the section taken along line A . . . A in FIG. 4.

As shown in FIG. 3, each of the LED elements 30a comprises a plurality (in the shown example three) of bare LED dies 32 provided on a flat rectangular ceramic carrier 34.

Figure 2:
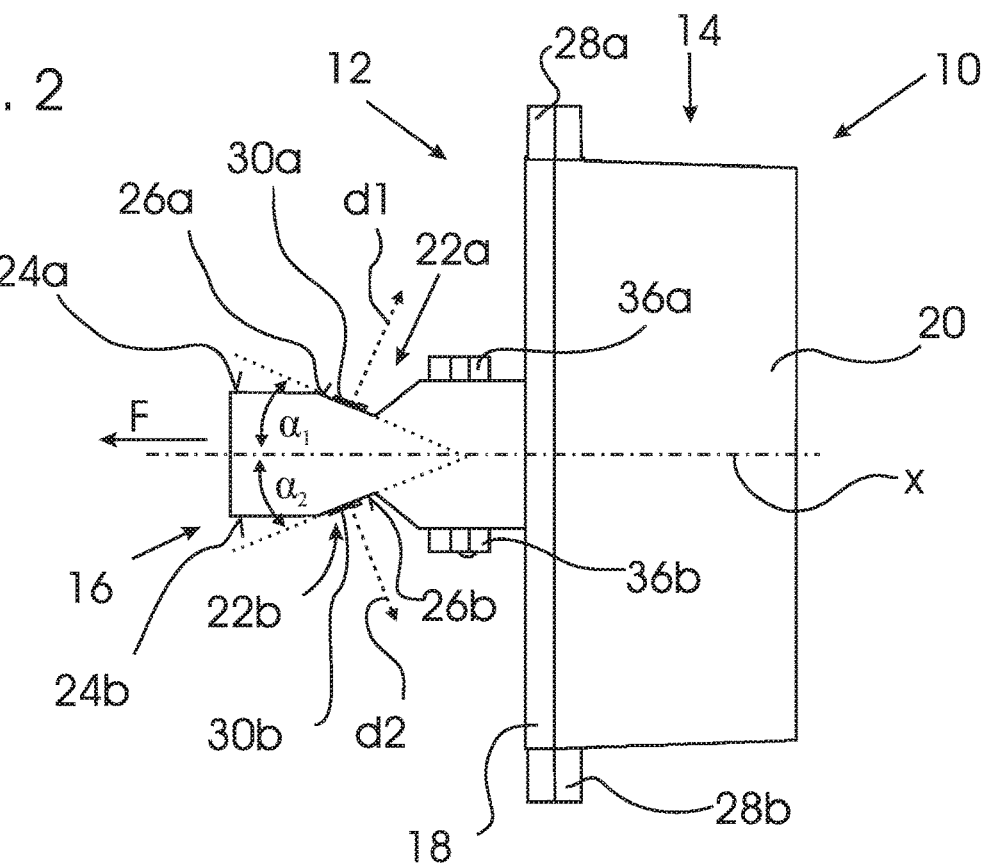
FIG. 2 shows a side view of the lighting module of FIG. 1.

As visible in particular from FIG. 2, the mounting surfaces 26a, 26b are arranged under angles $\alpha_1$, $\alpha_2$ relative to the forward direction F and the longitudinal axis X. In the example shown, the angles $\alpha_1$, $\alpha_2$ are both at approximately 25°.

In FIG. 2, vectors d1 and d2 designate the normal vectors of the mounting surfaces 26a, 26b. Since the LED elements 30a, 30b are flat and provided with LED dies 32 without optics, the vectors d1, d2 constitute the central light emission direction (center of the lambertian light emission characteristics).

As shown in FIG. 2, the direction of the vectors d1, d2 is partially backwards, i.e. the vectors d1, d2 have a directional component opposed to the forward direction F.

In alternative embodiments, the mounting surfaces 26a, 26b may be arranged to face into different directions, e.g. facing sideways under a 0° angle to the longitudinal axis X, or facing fully or partially forward.

The heat sink 12 of the lighting module 10 is provided with a plastic overcoat 48. The overcoat 48 is molded over the metal heat sink. The overcoat 48 has windows or cutouts formed at the mounting surfaces 26a, 26b to allow directly mounting the LED elements 30a, 30b onto the metal surface of the heat sink.

The lighting module 10 further has a number of module alignment protrusions: A first set of alignment protrusions 28a, 28b is provided on the body portion 14 of the heat sink 12, a second set of alignment protrusions 36a, 36b is provided on the upper and lower surfaces 24a, 24b of the protrusion portion 16 and a third type of alignment protrusion 38 is provided on a lateral surface of the protrusion portion 16. As will be explained below, the alignment protrusions 28a, 28b, 36a, 36b, 38 serve to achieve exact positioning of the lighting module 10 when installed in a lighting system. The alignment protrusions 28a, 28b, 36a, 36b, 38 are formed as part of the plastic overcoat 48.

The lighting module 10 further comprises an electrical plug connector 40 (see FIG. 4) provided at the back of the body portion 14 of the heat sink 12, integrated within a cut out 42 formed between the heat fins 20. The electrical plug connector 40 comprises electrical contact tabs 44 (two pairs, each pair being connected to two poles of each LED element 30a, 30b) arranged to protrude into a space surrounded by a plug housing 46. As shown in the sectional view of FIG. 5, electrical conductors 50 in the form of lead frame elements embedded within a plastic material 52 extend through openings within the plate 18 and through channels within the protrusion portion 16 from the contact tabs 44 to contact pads 54 (FIG. 3) on the mounting surfaces 26a, 26b.

As further shown in FIG. 3, the LED elements 30a, 30b are electrically contacted to the contact pads 54 by ribbon bonds 56. The electrical contacts may be potted, e.g. in Silicone, for protection.

Figure 6:
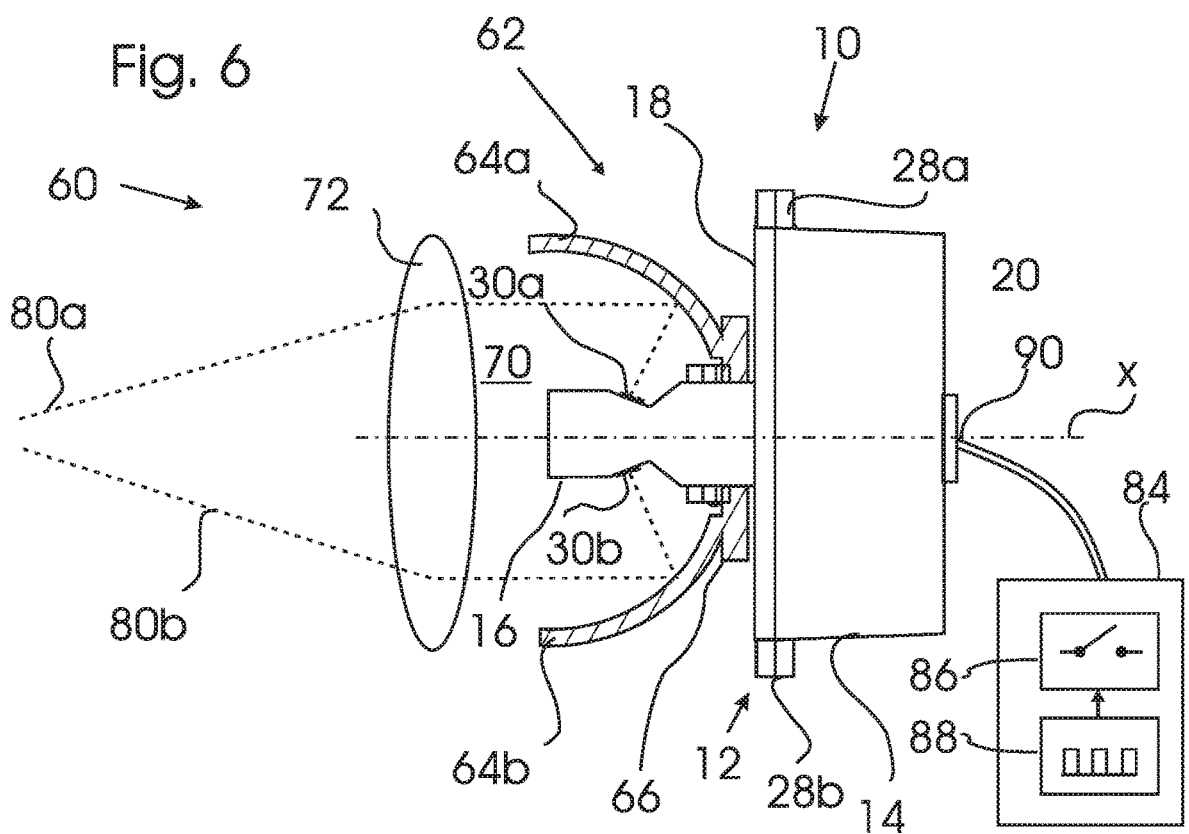
FIG. 6 shows a partly sectional side view of a lighting system with the lighting module according to FIGS. 1-5.

The lighting module 10 may be operated by connecting a power supply plug 90 as shown in FIG. 6 to the electrical plug connector 40 and supplying electrical power to the LED elements 30a, 30b through the conductors 50, contact pads 54 and ribbon bonds 56. The LED elements 30a, 30b then emit light as lambertian emitters around the central directions d1, d2.

FIG. 6 shows a lighting system 60 including the lighting module 10 described above. In addition to the lighting module 10, the lighting system 60 comprises an optical system (shown here only schematically) including a reflector assembly 62 with a reflector comprising an upper reflector part 64a and lower reflector part 64b and a mounting portion 66 including a mounting opening 68 leading to an inner reflector space 70 partially surrounded by the upper and lower reflector parts 64a, 64b. Further, the optical system comprises a lens 72 arranged in front of the reflector assembly 62.

As further shown schematically in FIG. 6, the lighting system 15 comprises a driver circuit 84 electrically connected via a cable and the power supply plug 90 to the lighting module 10.

As shown in FIG. 6, the lighting module 10 is mounted to the reflector assembly 62 by attaching the lighting module 10 to the mounting portion 66 thereof, thereby inserting the protrusion portion 16 through the mounting opening 68 to protrude into the inner reflector space 70.

The lighting module 10 is accurately positioned relative to the reflector assembly 62 such that the LED modules 30a, 30b are arranged at a specified, known position within the reflector space 70. Exact positioning is achieved by the positioning protrusions 28a, 28b, 36a, 36b and 38, which are received in corresponding reflector assembly alignment indentations (not shown in FIG. 6).

Further, the lighting module 10 is fixed to the reflector assembly 62 by clamping (not shown).

Thus, the lighting module 10 is attached exchangeably at the reflector assembly 62. The lighting module 10 may be exchanged by disconnecting the electrical plug connection 90, 40, loosening the mechanical clamping connecting (not shown) and then withdrawing the lighting module 10 from the reflector assembly 62 by backward movement along the axis X. Likewise, a replacement lighting module 10 may be installed, replacing the previous lighting module 10.

FIG. 6 shows the arrangement of the LED elements 30a, 30b within the reflector space 70. Due to the partially backwards facing orientation of the LED elements 30a, 30b, the inner reflector surfaces of upper and lower reflector parts 64a, 64b are well illuminated and reflect the emitted light to form a first beam 80a and a second beam 80b which are projected by projection lens 72 as emitted beams.

The LED elements 30a, 30b thus illuminate separate portions 64a, 64b of the reflector assembly 62. The shape of the reflector parts 64a, 64b may be chosen to obtain, in conjunction with the projection lens 72, desired light distributions of resulting beams 80a, 80b.

Figure 8:
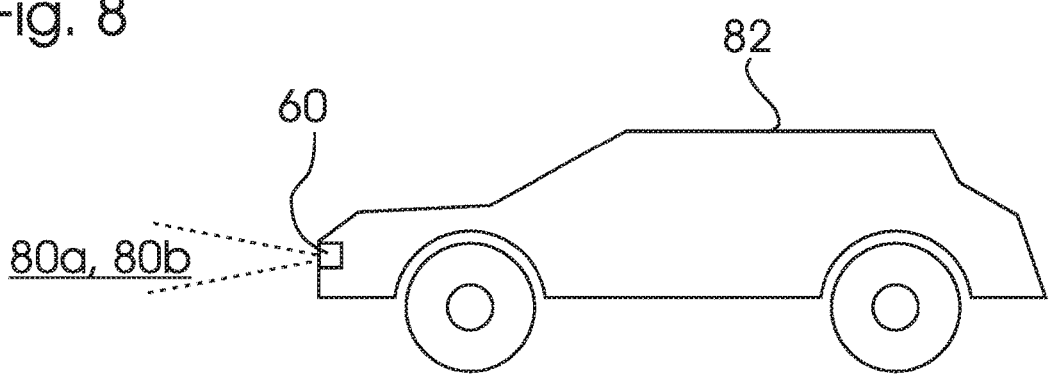
FIG. 8 schematically shows a motor vehicle with a lighting system according to FIG. 6 as headlight.

For example, the lighting system 60 may form a headlight of a motor vehicle 82 as schematically shown in FIG. 8. The emitted low beam illumination 80a is generated from light emitted from the first LED element 30a, whereas the high beam illumination 80b is formed from light emitted from the second LED element 30b and from the first LED element 30a. Naturally, different beam patterns and combinations thereof are possible.

The driver circuit 84 comprises, as schematically shown in FIG. 6, power circuitry 86 disposed to generate and switch electrical current/voltage as suited for the operation of the LED elements 30a, 30b, and a control circuit 88 to control the switching patterns of the voltage/current delivered from the power circuitry 86 to the LED elements 30a, 30b of the LED module 10.

The driver 84 has separate electrical connections to the LED elements 30a, 30b via the cable, the power supply plug 90 and electrical plug connector 40, embedded conductors 50, contact surfaces 54 and ribbon bonds 56. Thus, the driver circuit 84 can operate the LED elements 30a, 30b separately and independently of one another, according to the switching patterns provided by the control circuit 88.

The control circuit 88 is configured to operate the LED elements 30a, 30b of the lighting module 10 differently according to different lighting modes. In a first lighting mode, corresponding for example to a low beam mode, the driver 84 operates the lighting module 10 to emit the resulting low beam illumination 80a, i.e. comprising an at least substantially horizontal bright/dark cut off according to automotive regulations. In the low beam mode, the driver 84 supplies electrical operating power only to the first LED element 30a and not to the second LED element 30b, which thus remains turned off. The resulting low beam illumination 80a is generated from the light emitted from the first LED element 30a, reflected at the upper reflector part 64a and projected through projection lens 72 as a low beam pattern.

Since the second LED element 30b is not operated in the low beam mode, only heat generated at the first LED element 30a must be dissipated by the heat sink 12.

In a second mode of operation of the driver circuit 84 and of the lighting system 16 as a whole, which may be e.g. referred to as a high beam mode, the control circuit 88 controls the power circuitry 86 to supply more electrical operating power to the second LED element 30b than to the first LED element 30a. In the high beam mode, the resulting high beam illumination 80b is generated by the light emitted from the second LED element 30b, reflected at the lower reflector part 64b and projected by projection lens 72 as a high beam pattern, i.e. an intensity distribution without a horizontal bright/dark cut off, and by the light emitted from the first LED element 30a, reflected at the upper reflector part 64a and projected through projection lens 72 as a low beam pattern.

In the high beam mode, both LED elements 30a, 30b are operated to emit light. However, the first LED element 30a is operated in the dimmed state, such that the generated heat that needs to be dissipated is less.

Thus, the disjunct mode of operation of the first and second LED elements 30a, 30b in the high power state in the first and second operating mode allows to limit the thermal load to be dissipated by the heat sink 12.

Figure 7A:
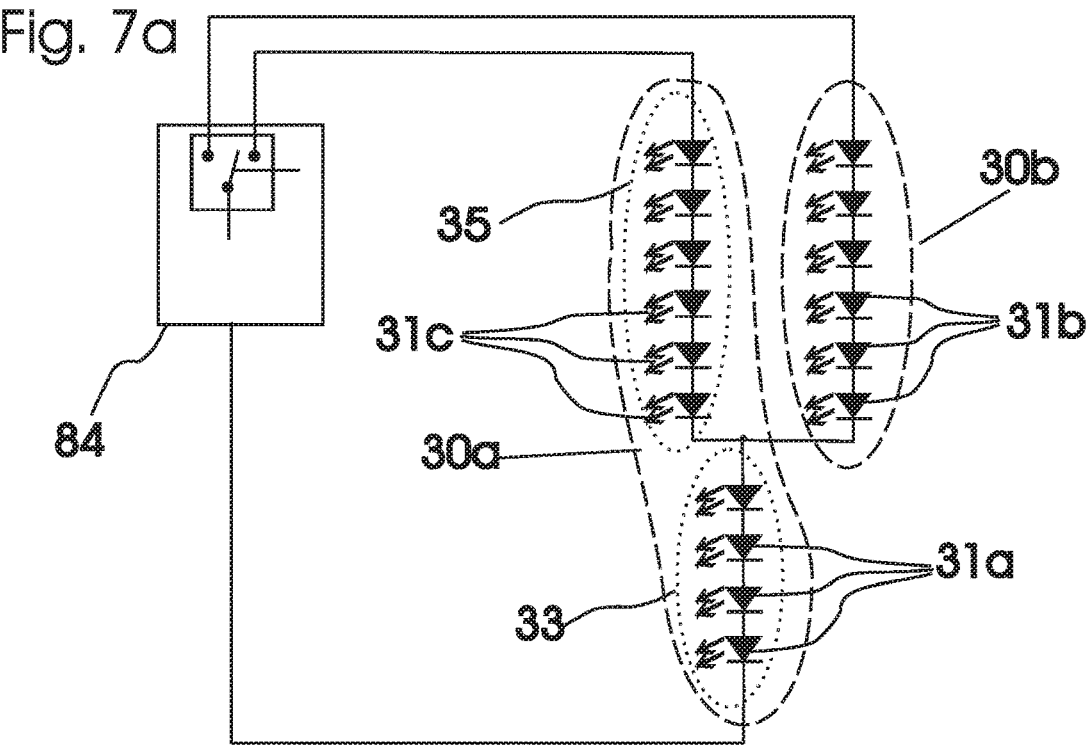
FIGS. 7a, 7b schematically show a first and a second LED element of a second embodiment of a lighting module.

According to a second embodiment, FIG. 7a shows an electrical, logical connection of the LED elements 30a, 30b. A lighting module according to the second embodiment corresponds to the lighting module 10 according to the first embodiment. In the following, only differences between the first and the second embodiments will be elucidated. The same reference signs refer to the same elements.

The first LED element 30a comprises ten equal, bare LED dies 31a, 31c which are allocated into a first group 33 and a second group 35. The first group 33 comprises four LEDs 31a of the ten bare LED dies 32 which are electrically connected in series. The second group 35 comprises the other six LEDs 31c which are analogously connected in series. The second LED element 30b comprises six equal, bare LED dies 31b. The LEDs 31b of the second LED element are also electrically connected in series.

The LEDs 31c of the second group 35 are electrically connected in parallel with the LEDs 31b of the second LED element 30b. The LEDs 31a of the first group 33 are connected in series with the parallel connection comprising the second group 35 and the second LED element 30b. Driver means 84 are electrically connected between the first group 33 and the parallel connection.

Figure 7B:
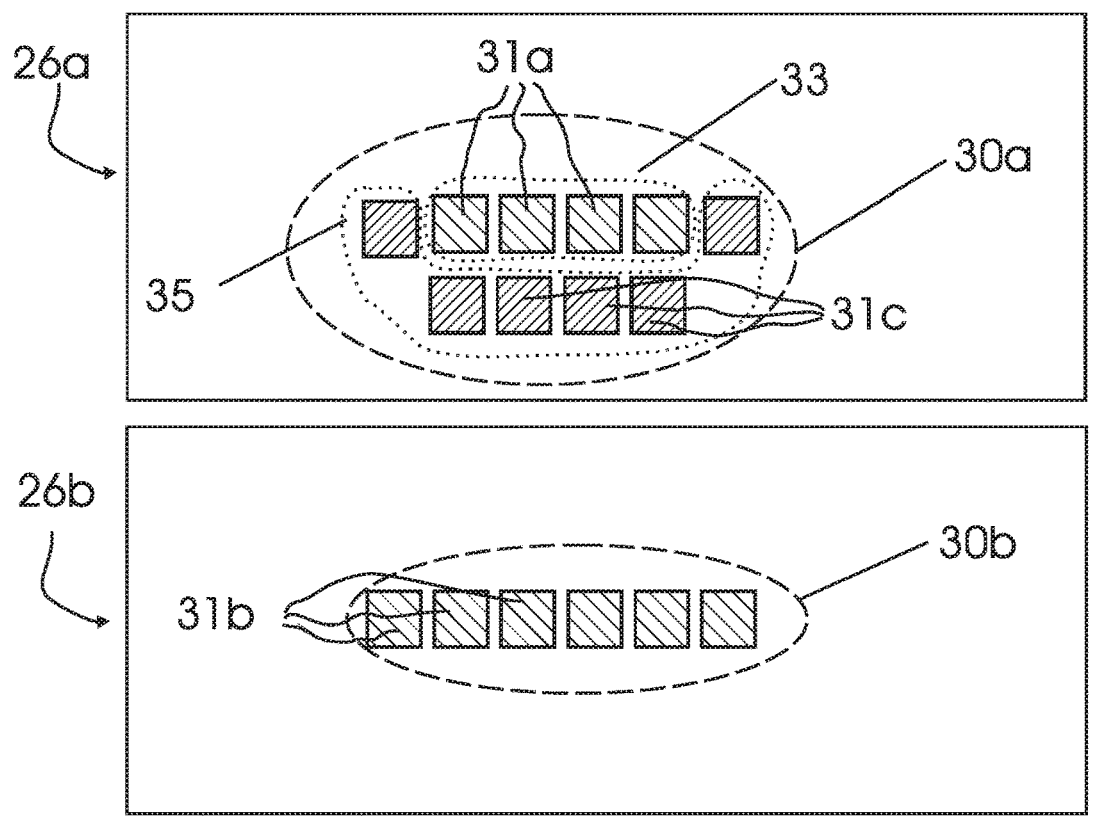

FIG. 7b exemplary shows a schematic illustration of an arrangement of the LEDs 31a, 31b, 31c. According to a lighting system of the second embodiment, the first LED element 30a is attached on a first mounting surface 26a and the second LED element 30b is attached on a second mounting surface 26b. The LEDs 31a, 31c of the first LED element 30a are arranged adjacent to each other within two horizontal rows. Six LEDs 31a, 31c are arranged in an upper row and the other four LEDs 31c are arranged in the other row directly subjacent of the upper row. Thereby, the first group 33 is arranged in the upper row while the second group 35 is arranged in the upper and in the subjacent row partially surrounding the first group 33. The LEDs 31b of the second LED element 30b are arranged adjacent to each other within one horizontal row.

In a first mode, to realize a low beam illumination 80a, driver means 84 operate a switch such that the second group 35 and the first group 33 are electrically connected in series. Thus, the first LED element 30a is operated in a high power state because all its LEDs 31a, 31c are provided with electrical power. Therefore, in the first mode, all LEDs 31a, 31c that are attached on the first mounting area 26a emit light, while the LEDs 31b that are attached on the second mounting surface 26b remain turned off.

In a second mode, to realize a high beam illumination 80b, driver means 84 operate a switch, such that the second LED element 30b and the first group 33 are electrically connected in series. All the LEDs 31b of the second LED element 30b and the serially connected LEDs 31a of the first group 33 emit light. Thus, the second LED element 30b is operated in a high power state because all its LEDs 31b are provided with electrical power, and the first LED element 30a is operated in a dimmed state to emit dimmed light because only the LEDs 31 that belong to the first group 33 are provided with electrical power. In the second mode, the LEDs 31b that are attached on the second mounting area 26b and the LEDs 31a of the first group 33 that are on the first mounting surface 26a emit light. The other LEDs 31c that are attached on the first mounting area 26a and that belong to the second group 35 remain turned off.

In this embodiment, to switch between the disjunct first and second mode, the driver means 84 switch between the two paths of the parallel connection.

While the invention has been illustrated and described in detail in the drawings and foregoing description, such illustration and description are to be considered illustrative or exemplary and not restrictive; the invention is not limited to the disclosed embodiments.

In particular, the specific shape of the lighting module 10 as shown should be considered exemplary; different shapes are possible. The shape of the heat sink 12 with a protrusion portion 16 is preferred, but different shapes are possible. The LED elements 30a, 30b which are shown as facing partially backwards may be arranged to face into different directions.

The driver circuit 84, shown as a separate entity spaced from the LED module 10 may alternatively be integrated either into the LED module 10 or mounted to the reflector assembly 62.

Further, different lighting functions besides high beam and low beam may be implemented, i.e. by providing different reflector shapes other beam types may be generated.

These and other variations of the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

The mere fact that certain measures or features are recited in mutually different dependent claims or disclosed in separate embodiments does not indicate that a combination of these measures and features cannot be used to advantage. Any reference signs in the claims should not be construed as limiting the scope.

What is claimed is:

1. A lighting system, comprising:
   a lighting module including a rigid heat sink;
   a first LED element direclty mounted on the heat sinkin in a backward facing orientation, the first LED element being disposed and arranged such that light emitted therefrom in operation is emitted from the lighting system as a low beam pattern;
   a second LED element directly mounted on the heat sink in a backward facing orientation, the second LED element being disposed and arranged such that light emitted therefrom in operation is emitted from the lighting system as a high beam pattern,
   the heat sink being configured to maintain the first LED element and the second LED element in a symmetrical configuration configured to maintain the backward facing orientation of the first LED element and the second LED element;
   a driver circuit electrically connected to the first LED element and the second LED element to selectively supply electrical power for operation thereof by:
      in a first mode, operating the first LED element in a high power state, while the second LED element is turned off, to provide a low beam illumination, and
      in a second mode, operating the first LED element in a dimmed state, while operating the second LED element in a high power state, to provide a high beam illumination.

2. The lighting system according to claim 1, wherein in the high power state the first LED element is operated at a higher electrical power than in the dimmed state.

3. The lighting system according to claim 1, wherein the driver circuit is configured to operate the first LED element in the dimmed state with pulse width modulation, such that the electrical operating power of the first LED element in the dimmed state is less than the electrical operating power of the first LED element in the high power state.

4. The lighting system according to claim 1, wherein:
   the first LED element comprises a plurality of LEDs,
   the driver circuit is configured to operate at least one of a first number of the plurality of LEDs in the first mode and a second number of the plurality of LEDs in the second mode,
   the first number of the plurality of LEDs is higher than the second number of the plurality of LEDs.

5. The lighting system according to claim 4, wherein:
   the first LED element comprises a first group of the plurality of LEDs and a second group of the plurality of LEDs, and
   the driver circuit is configured to operate the first group of the plurality of LEDs in the first mode and in the second mode, and operate the second group of the plurality of LEDs in the first mode and not in the second mode.

6. The lighting system according to claim 5, wherein:
   the second group of the plurality of LEDs is electrically connected in parallel with the second LED element, and
   the second group of the plurality of LEDs and the second LED element are electrically connected in series with the first group of the plurality of LEDs.

7. The lighting system according to claim 1, wherein:
   the heat sink comprises a body portion and a protrusion portion protruding from the body portion, and
   at least one of the first LED element and the second LED element are mounted on the protrusion portion.

8. The lighting system according to claim 7, wherein the first LED element and second LED element are mounted on opposite sides of the portrusion portion.

9. The lighting system according to claim 8, wherein the first LED element is arranged directly opposite to the second LED element.

10. The lighting system according to claim 7, wherein the protrusion portion of the heat sink is formed in one piece with the body portion.

11. The lighting system according to claim 7, further comprising a headlight assembly including an optical system, the lighting module being exchangeably mounted to the head light assembly.

12. The lighting system according to claim 11, wherein:
   the optical system includes a concave reflector with an inner reflector space, and
   the protrusion portion projects into the reflector space.

13. The lighting system according to claim 1, wherein, in the high power state, the driver circuit is configured to supply the first LED element with less than 50% of the electrical power supplied in the high power state.

14. A vehicle headlight, comprising:
   a lighting system including:
      a lighting module including a rigid heat sink,
      a first LED element direclty mounted on the heat sink in a backward facing orientation, the first LED element, being disposed and arranged such that light emitted therefrom in operation is emitted from the lighting system as a low beam pattern,
      a second LED element directly mounted on the heat sink in a backward facing orientation, the second LED element being disposed and arranged such that light emitted therefrom in operation is emitted from the lighting system as a high beam pattern,
      the heat sink being configured to maintain the first LED element and the second LED element in a symmetrical configuration configured to maintain the backward facing orientation of the first LED element and the second LED element,
      a driver circuit electrically connected to the first LED element and the second LED element to selectively supply electrical power for operation thereof by:
         in a first mode, operating the first LED element in a high power state, while the second LED element is turned off, to provide a low beam illumination, and in a second mode, operating the first LED element in a dimmed state, while operating the second LED element in a high power state, to provide a high beam illumination.

15. The vehicle headlight of claim 14, wherein:
the first LED element comprises a plurality of LEDs,
the driver circuit is configured to operate at least one of a first number of the plurality of LEDs in the first mode and a second number of the plurality of LEDs in the second mode, and
the first number of the plurality of LEDs is higher than the second number of the plurality of LEDs.

16. The vehicle headlight of claim 14, wherein, in the high power state, the driver circuit is configured to supply the first LED element with less than 50% of the electrical power supplied in the high power state.

* * * * *